United States Patent
Schatz et al.

(10) Patent No.: US 12,511,560 B2
(45) Date of Patent: Dec. 30, 2025

(54) METHODS, APPARATUSES AND COMPUTER PROGRAM PRODUCTS FOR GENERATING SYNTHETIC DATA

(71) Applicant: META PLATFORMS, INC., Menlo Park, CA (US)

(72) Inventors: Martin Schatz, Seattle, WA (US); Dmitry Vengertsev, Harrington Park, NJ (US); Yifan Liu, San Mateo, CA (US); Ilana Marisa Arbisser, San Francisco, CA (US); Yuchen Hao, Sunnyvale, CA (US); Muhammet Mustafa Ozdal, Menlo Park, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 954 days.

(21) Appl. No.: 17/701,102

(22) Filed: Mar. 22, 2022

(65) Prior Publication Data
US 2023/0306291 A1   Sep. 28, 2023

(51) Int. Cl.
*G06N 7/01*   (2023.01)

(52) U.S. Cl.
CPC ..................... *G06N 7/01* (2023.01)

(58) Field of Classification Search
CPC ....................................... G06N 7/01
See application file for complete search history.

(56) References Cited

U.S. PATENT DOCUMENTS

| | | |
|---|---|---|
| 2011/0222783 A1 | 9/2011 | Matsunobu et al. |
| 2021/0037044 A1 | 2/2021 | Achanta et al. |

OTHER PUBLICATIONS

International Preliminary Report on Patentability for International Application No. PCT/US2023/015811, mailed Oct. 3, 2024, 8 pages.
Acun B., et al., "Understanding Training Efficiency of Deep Learning Recommendation Models at Scale," IEEE International Symposium on High Performance Computer Architecture, Nov. 11, 2020, 13 pages.
Eisenman A., et al., "Bandana: Using Non-Volatile Memory for Storing Deep Learning Models," 2018, 13 Pages.
Gupta U., et al., "The Architectural Implications of Facebook's DNN-Based Personalized Recommendation," IEEE International Symposium on High-Performance Computer Architecture (HPCA 2020), Feb. 15, 2020, 14 pages, Retrieved from the Internet: URL: https://arxiv.org/abs/1906.03109.
Liu KE., et al., "RecNMP: Accelerating Personalized Recommendation with Near-Memory Processing," arxiv.org, Dec. 30, 2019, 14 Pages.
Maeng K., et al., "CPR: Understanding and Improving Failure Tolerant Training for Deep Learning Recommendation with Partial Recovery," Proceedings of Machine Learning and Systems, 2021, 15 pages.

(Continued)

*Primary Examiner* — Eric J. Bycer
(74) *Attorney, Agent, or Firm* — EVERSHEDS SUTHERLAND (US) LLP (57) ABSTRACT

A system for generating simulated data is disclosed. The system may determine items of content utilized by a network. The system may also retrieve one or more data patterns associated with one or more features associated with the content. The system may also determine a plurality of indices associated with the data patterns. The system may also generate, based on the data patterns and the plurality of indices, simulated data associated with the content.

14 Claims, 6 Drawing Sheets

(56) References Cited

OTHER PUBLICATIONS

Wilkening M., et al., "RecSSD: Near Data Processing for Solid State Drive Based Recommendation Inference," Proceedings of the 26th ACM International Conference on Architectural Support for Programming Languages and Operating Systems, Apr. 2021, 13 pages.
International Search Report and Written Opinion for International Application No. PCT/US2023/015811, mailed Jun. 28, 2023, 10 pages.
Nellikar S., et al., "Role-Based Differentiation for Insider Detection Algorithms," Proceedings of the 2010 ACM Workshop on Insider Threats, Oct. 8, 2010, pp. 55-62.
Yu Y., "Scalable, Synthetic, Sensor Network Data Generation," University of California, Jan. 1, 2005, 154 pages, Retrieved from the Internet: URL: http://citeseerx.ist.psu.edu/viewdoc/download?doi=10.1.1.111.6699&rep=rep1type=pdf.
Aghamohammadi C., et al., "The Markov Memory for Generating Rare Events," Statistical Mechanics, arXiv:1610.07685, Oct. 2016, 10 pages.
Hassan R., et al., "Synthetic Trace-Driven Simulation of Cache Memory," IEEE 21st Int'l Conf. on Advanced Information Networking and Applications Workshops, May 2007, pp. 764-771.
Munkhammar J., et al., "A Markov-Chain Probability Distribution Mixture Approach to the Clear-Sky Index," Solar Energy, 2018, vol. 170, pp. 174-183.
Naumov M., et al., "Deep Learning Recommendation Model for Personalization and Recommendation Systems," Facebook, May 31, 2019, 10 pages, Retrieved from the Internet: URL: https://arxiv.org/abs/1906.00091.
Pasinato M., et al., "Generating Synthetic Data for Context-Aware Recommender Systems," IEEE BRICS Congress on Computational Intelligence & 11th Brazilian Congress on Computational Intelligence, 2013, 5 pages.

FIG. 6

METHODS, APPARATUSES AND COMPUTER PROGRAM PRODUCTS FOR GENERATING SYNTHETIC DATA

TECHNOLOGICAL FIELD

Exemplary embodiments of this disclosure relate generally to methods, apparatuses and computer program products for generating synthetic data associated with content of a system to facilitate generation of tailored hardware and/or applications.

BACKGROUND

Currently, some hardware developers may utilize representations of actual system data for designing applications and/or hardware tailored for usage by the system. In this regard, some existing systems typically rely on actual system data to observe characteristics that may impact computational performance for the design of the applications and/or hardware. Although actual system data may provide high fidelity for application/hardware design, some disadvantages may include reading of the actual data may be lengthy and laborious and may undesirably constrain processing resources of computing devices and may not adequately protect privacy associated with the actual data. As such, it may be beneficial to provide techniques to overcome these drawbacks.

BRIEF SUMMARY

Exemplary embodiments may utilize a statistical model to generate synthetic data (e.g., simulated data) that mimics actual content (also referred to herein as production data) of a system to accurately capture beneficial characteristics of the content (e.g., network content). As referred to herein, production data, production data workloads or the like may be data content that a system/network observes when the system/network operates for its intended purposes, for example, operating in a production environment as opposed to test or staging environments. The synthetic data may be beneficial to design a tuned architecture (e.g., hardware (e.g., a chip), an application). For instance, the exemplary embodiments may utilize embedding lookup data patterns to facilitate generation of synthetic data that may preserve certain statistical characteristics associated with the actual content corresponding to the system and the synthetic data may be pertinent to the generation of application(s) and/or hardware designs.

In some exemplary embodiments, the synthetic data may be provided to one or more external systems to facilitate the generation of the application(s) and/or hardware. Since the synthetic data may not be the actual system content, the synthetic data may be more easily sharable with these external systems for developing the application(s) and/or hardware. The synthetic data may mimic one or more characteristics/qualities of actual system content and may be utilized for hardware (e.g., a chip(s)) optimization while minimizing privacy risks since the actual system content may not be shared with external systems.

During the generation of the synthetic data, the exemplary embodiments may provide a mechanism to understand memory access patterns associated with lookup tables (e.g., embedding lookup tables) to develop adaptive memory optimizations for the lookup tables. The lookup tables may be associated with actual content of the system used, in part, to generate the synthetic data. These memory access patterns may be beneficial for the generation of application(s) and/or hardware designs that may be tailored for the system.

In one example embodiment, a method for generating simulated data is provided. The method may include determining items of content utilized by a network. The method may further include retrieving one or more data patterns associated with one or more features associated with the content. The method may further include determining a plurality of indices associated with the data patterns. The method may further include generating, based on the data patterns and the plurality of indices, simulated data associated with the content.

In another example embodiment, a system for generating simulated data is provided. The system may include a device including one or more processors and a memory including computer program code instructions. The memory and computer program code instructions are configured to, with at least one of the processors, cause the device to at least perform operations including determining items of content utilized by a network. The memory and computer program code are also configured to, with the processor, cause the device to retrieve one or more data patterns associated with one or more features associated with the content. The memory and computer program code are also configured to, with the processor, cause the device to determine a plurality of indices associated with the data patterns. The memory and computer program code are also configured to, with the processor, cause the device to generate, based on the data patterns and the plurality of indices, simulated data associated with the content.

In yet another example embodiment, a computer program product for generating simulated data is provided. The computer program product includes at least one computer-readable storage medium having computer-executable program code instructions stored therein. The computer-executable program code instructions may include program code instructions configured to determine items of content utilized by a network. The computer program product may further include program code instructions configured to retrieve one or more data patterns associated with one or more features associated with the content. The computer program product may further include program code instructions configured to determine a plurality of indices associated with the data patterns. The computer program product may further include program code instructions configured to generate, based on the data patterns and the plurality of indices, simulated data associated with the content.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The summary, as well as the following detailed description, is further understood when read in conjunction with the appended drawings. For the purpose of illustrating the disclosed subject matter, there are shown in the drawings exemplary embodiments of the disclosed subject matter; however, the disclosed subject matter is not limited to the specific methods, compositions, and devices disclosed. In addition, the drawings are not necessarily drawn to scale. In the drawings.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein "synthetic data," may refer to simulated data associated with a network in which the simulated data may not be the actual data/content associated with the network and may for example be a statistical approximation of the actual data. The synthetic data may mimic one or more characteristics/qualities of the actual data.

It is to be understood that the methods and systems described herein are not limited to specific methods, specific components, or to particular implementations. It is also to be understood that the terminology used herein is for the purpose of describing particular embodiments only and is not intended to be limiting.

Exemplary System Architecture

Figure 1:
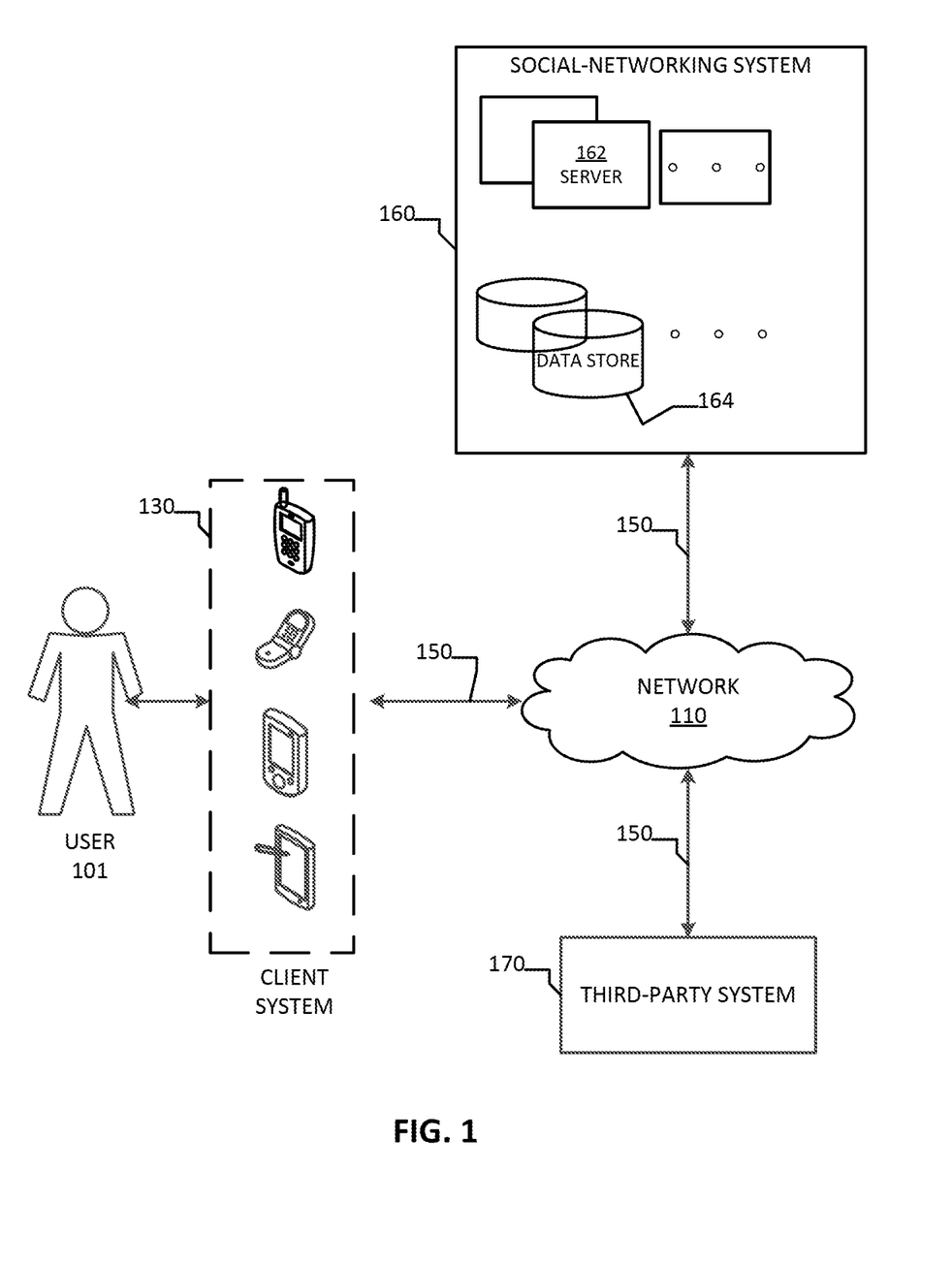
FIG. 1 is a diagram of an exemplary network environment in accordance with an exemplary embodiment.

FIG. 1 illustrates an example network environment 100 associated with a social-networking system 160 (also referred to herein as network device 160). Network environment 100 (also referred to herein as system 100) includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple client systems 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, one or more users 101 may use one or more client systems 130 to access, send data to, and receive data from social-networking system 160 or third-party system 170.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, global positioning system (GPS) device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable user 101 to access network 110. A client system 130 may enable its user 101 to communicate with other users 101 at other client systems 130.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user 101) or multiple concept nodes (each corresponding to a particular concept)—and multiple edges connecting the nodes. Social-networking system 160 may provide users 101 of the online social network the ability to communicate and interact with other users 101. In particular embodiments, users 101 may join the online social network via social-networking system 160 and then add connections (e.g., relationships) to a number of other users 101 of social-networking system 160 to whom they want to be connected. Herein, the term "friend" may refer to any other user 101 of social-networking system 160 with whom a user 101 has formed a connection, association, or relationship via social-networking system 160.

In particular embodiments, social-networking system 160 may provide users 101 with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with images/videos, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, social-networking system 160 also includes user-generated content objects, which may enhance a user's interactions with social-networking system 160. User-generated content may include any data a user (e.g., user 101) may add, upload, send, or "post" that is publicly (e.g., not private) available to social-networking system 160. As an example and not by way of limitation, a user may communicate public posts to social-networking system 160 from a client system 130. Public posts may include data such as status updates or other textual data, location information, photos, videos, audio, links, music or other similar data or media that is publicly available to social-networking-system 160. Content may also be added to social-networking system 160 by a third-party through a "communication channel," such as a newsfeed or stream.

Exemplary Communication Device

Figure 2:
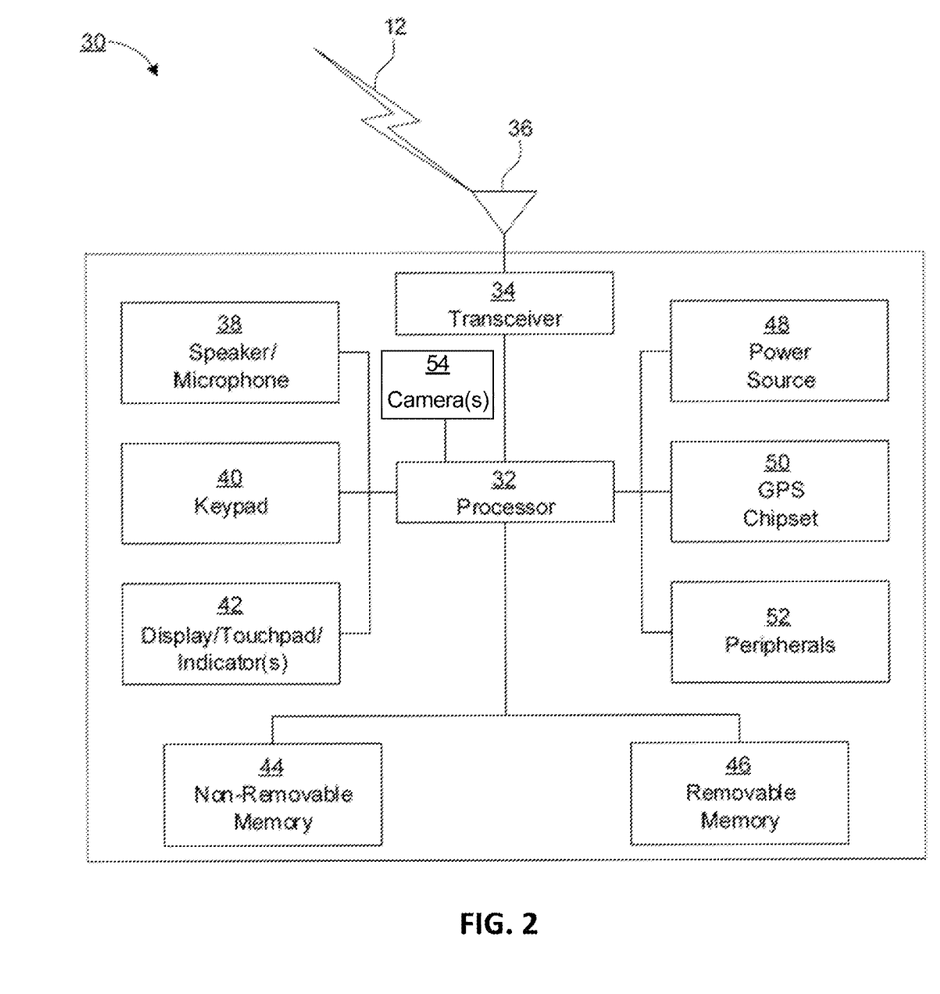
FIG. 2 is a diagram of an exemplary communication device in accordance with an exemplary embodiment.

FIG. 2 illustrates a block diagram of an exemplary hardware/software architecture of a communication device such as, for example, user equipment (UE) 30. In some exemplary embodiments, the UE 30 may be any of client systems 130 (also referred to herein as client devices 130). In some exemplary embodiments, the UE 30 may be a computer system such as for example a cellular telephone, a smartphone, a desktop computer, notebook or laptop computer, netbook, a tablet computer (e.g., a smart tablet), e-book reader, global positioning system (GPS) device, camera, personal digital assistant, handheld electronic device, smart glasses, augmented/virtual reality device, smart watch, or any other suitable electronic device. As shown in FIG. 2, the UE 30 (also referred to herein as node 30) may include a processor 32, non-removable memory 44, removable memory 46, a speaker/microphone 38, a keypad 40, a display, touchpad, and/or indicators 42, a power source 48, a GPS chipset 50, and other peripherals 52. The power source 48 may be capable of receiving electric power for supplying electric power to the UE 30. For example, the power source 48 may include an alternating current to direct current (AC-to-DC) converter allowing the power source 48 to be connected/plugged to an AC electrical receptable and/or Universal Serial Bus (USB) port for receiving electric power. The UE 30 may also include one or more cameras 54. In an exemplary embodiment, the cameras 54 may be smart cameras configured to sense images/videos appearing within one or more bounding boxes. The one or more cameras 54 may capture one or more images/videos indicative of a scene (e.g., from a viewpoint of a user). In other words, the one or more cameras 54 may identify/capture the scene or view which the user sees. The UE 30 may also include communication circuitry, such as a transceiver 34 and a transmit/receive element 36. It will be appreciated the UE 30 may include any sub-combination of the foregoing elements while remaining consistent with an embodiment.

The processor 32 may be a special purpose processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node 30 in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

The processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected.

The transmit/receive element 36 may be configured to transmit signals to, or receive signals from, other nodes or networking equipment. For example, in an exemplary embodiment, the transmit/receive element 36 may be an antenna configured to transmit and/or receive radio frequency (RF) signals. The transmit/receive element 36 may support various networks and air interfaces, such as wireless local area network (WLAN), wireless personal area network (WPAN), cellular, and the like. In yet another exemplary embodiment, the transmit/receive element 36 may be configured to transmit and/or receive both RF and light signals. It will be appreciated that the transmit/receive element 36 may be configured to transmit and/or receive any combination of wireless or wired signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple radio access technologies (RATs), such as universal terrestrial radio access (UTRA) and Institute of Electrical and Electronics Engineers (IEEE 802.11), for example.

The processor 32 may access information from, and store data in, any type of suitable memory, such as the non-removable memory 44 and/or the removable memory 46. For example, the processor 32 may store session context in its memory, as described above. The non-removable memory 44 may include RAM, ROM, a hard disk, or any other type of memory storage device. The removable memory 46 may include a subscriber identity module (SIM) card, a memory stick, a secure digital (SD) memory card, and the like. In other exemplary embodiments, the processor 32 may access information from, and store data in, memory that is not physically located on the node 30, such as on a server or a home computer.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like. The processor 32 may also be coupled to the GPS chipset 50, which may be configured to provide location information (e.g., longitude and latitude) regarding the current location of the node 30. It will be appreciated that the node 30 may acquire location information by way of any suitable location-determination method while remaining consistent with an exemplary embodiment.

Exemplary Computing System

Figure 3:
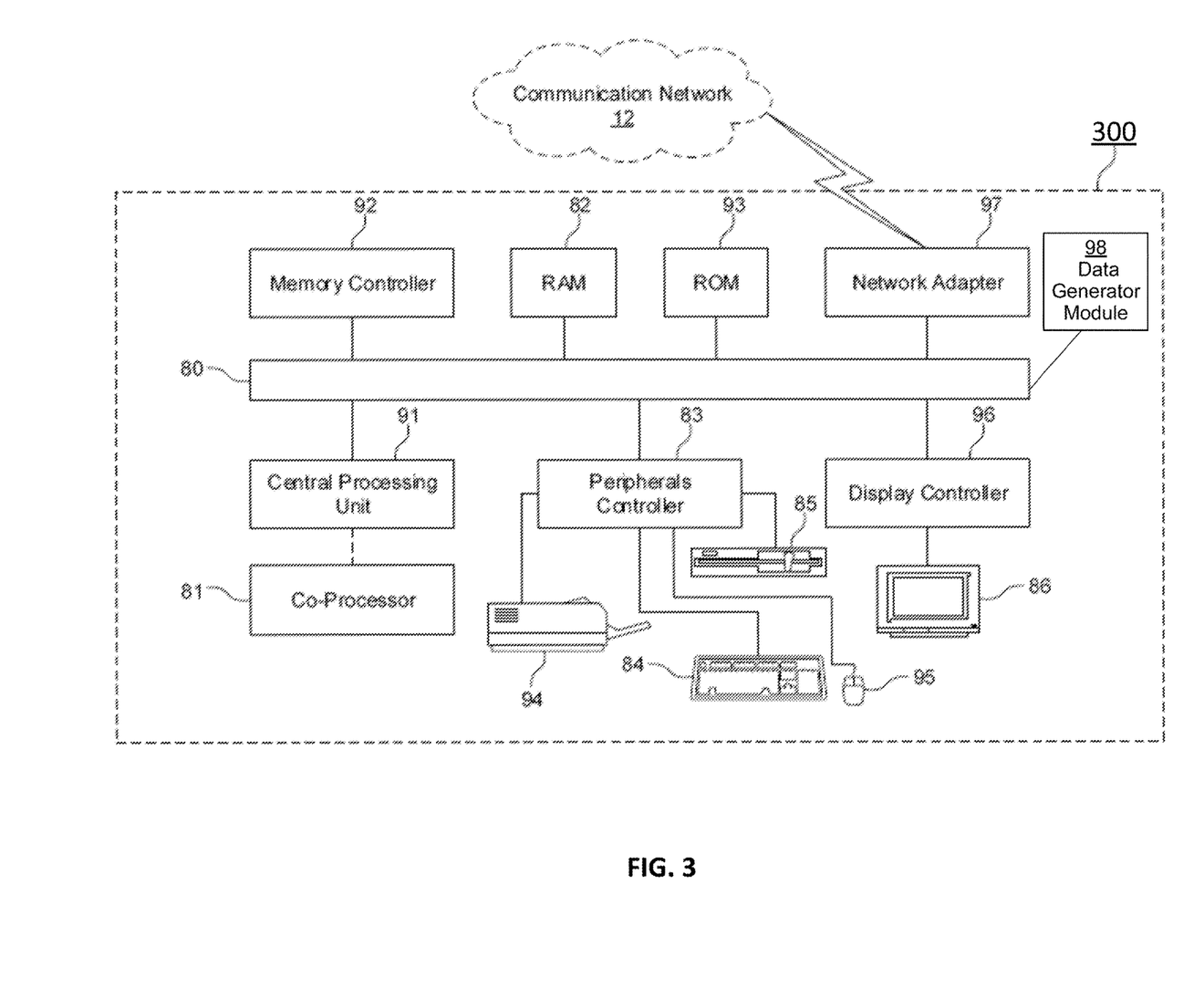
FIG. 3 is a diagram of an exemplary computing system in accordance with an exemplary embodiment.

FIG. 3 is a block diagram of an exemplary computing system 300. In some exemplary embodiments, the network device 160 may be a computing system 300. The computing system 300 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 300 to operate. In many workstations, servers, and personal computers, central processing unit 91 may be implemented by a single-chip CPU called a microprocessor. In other machines, the central processing unit 91 may comprise multiple processors. Coprocessor 81 may be an optional processor, distinct from main CPU 91, that performs additional functions or assists CPU 91.

In operation, CPU 91 fetches, decodes, and executes instructions, and transfers information to and from other resources via the computer's main data-transfer path, system bus 80. Such a system bus connects the components in computing system 300 and defines the medium for data exchange. System bus 80 typically includes data lines for sending data, address lines for sending addresses, and control lines for sending interrupts and for operating the system bus. An example of such a system bus 80 is the Peripheral Component Interconnect (PCI) bus. In an exemplary embodiment, the computing system 300 may include a synthetic data generator module 98 (also referred to herein as data generator module 98). The synthetic data generator module 98 may simulate data to obtain synthetic data associated with a network (e.g., system 100) in which the simulated data may not be the actual data associated with the network and may for example be a statistical approximation of the actual data. The synthetic data may mimic one or more characteristics/qualities of the actual data. In some exemplary embodiments, the actual data may be associated with production data which may, for example, be utilized by machine learning models associated with the network to provide one or more system recommendations.

Memories coupled to system bus 80 include RAM 82 and ROM 93. Such memories may include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 300 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 300. Such visual output may include text, graphics, animated graphics, and video. Display 86 may be implemented with a cathode-ray tube (CRT)-based video display, a liquid-crystal display (LCD)-based flat-panel display, gas plasma-based flat-panel display, or a touch-panel. Display controller 96 includes electronic components required to generate a video signal that is sent to display 86.

Further, computing system 300 may contain communication circuitry, such as for example a network adaptor 97, that may be used to connect computing system 300 to an external communications network, such as network 12 of FIG. 2, to enable the computing system 300 to communicate with other nodes (e.g., UE 30) of the network.

Exemplary System Operation

The exemplary embodiments may implement machine learning models in which sparse features may be accessed and evaluated through embeddings. As referred to herein, a feature(s) may be a property of an entity modeled by machine learning models. For purposes of illustration and not of limitation, in an instance in which a person is considered as the entity of the machine learning model, the features may include the person's height, weight, gender, income, etc. These features may be either continuous, e.g., represented by a number (in this example, height, weight, and income are continuous features), or categorical, e.g., unable to be represented by a number (in this example, gender is a categorical feature). The categorical features may be represented with numbers by a technique known as encoding. The encoding technique may list all the possible categories and assign a value of 1 to the category that the entity belongs to and a value of 0 otherwise. For instance, in a gender example, consider three genders (in this order): male, female, non-binary. In this example, a male entity may be expressed as a triplet (1, 0, 0), in which a triplet is a three dimensional vector; a female entity may be expressed as a triplet (0, 1, 0); and a non-binary entity may be expressed as a triplet (0, 0, 1). In an instance in which there is a categorical feature with many categories (e.g., a categorical feature such as nationality), encoding associated with the categories may provide long vectors in which many of the values of the vectors are 0. Categories with long vectors having many values of the vectors being 0 may be known as sparse. Therefore, a sparse feature may be a categorical feature with many categories such that when encoded, may provide long vectors with many zeroes, i.e., 0s (e.g., sparse vectors).

Sparse features expressed by this method of encoding may be very long, e.g., having high dimensionality. Embedding may be a technique to project these high-dimensional vectors into lower dimensional spaces to support more efficient machine learning model operations. Referring to the above gender example, the original encoding involves 3-dimensional vectors (e.g., the triplets). Embedding may be utilized to project these 3-dimensional vectors onto a 1-dimensional embedding space (also referred to herein as 1-dimensional embedding vectors), for example, with three 1-dimensional vectors (1), (2), and (3), representing males, females and non-binary, respectively.

For purposes of illustration and not of limitation, the type of device that a user(s) may utilize to access content on a network (e.g., a social network (e.g., social-networking system 160)) may be a sparse feature (for example, because it is categorical/not continuous, e.g., unable to be represented as a continuous number), and in machine learning models, these device types (e.g., sparse features) may be represented by a numerical matrix (e.g., a feature table, a lookup data table), where each row of the numerical matrix may correspond to a device type (e.g., an embedding). By representing sparse data in this manner, the exemplary embodiments may determine what types of devices, for example, a user(s) utilizes by keeping track of the row indices (e.g., the rows of the matrix) of the embeddings, and these indices associated with users may be lookup data patterns of interest. There may be hundreds of these sparse features considered in each machine learning model, each having a unique lookup data pattern (e.g., list of indices, indexes), and each of these sparse features may consist of thousands or millions of embeddings (e.g., depending on the size of the feature space).

For purposes of illustration and not of limitation, the unique webpages (e.g., social network pages) that a user visited in the past month may include many embeddings. The exemplary embodiments may provide a mechanism to generate synthetic data lookup patterns for each of the sparse features and the synthetic data may retain characteristics of the source data (e.g., actual data/content of a network).

By focusing on the lookup patterns in feature tables, the exemplary embodiments may provide/guide hardware designers (e.g., chip designers) with better techniques for tailoring their solutions such that network/system (e.g., social-networking system 160) production data workloads may run/execute with improved performance (for example, via power efficiency gains, raw throughput (e.g., bandwidth) improvement, lower latency, etc.). For instance, the lookup data patterns in feature tables may inform hardware designers (e.g., chip designers) regarding the manner in which to configure memory hierarchy such that necessary hardware (e.g., chip) real estate may be devoted to memory storage and data transfer. The distribution of embedding aggregation may also inform hardware designers (e.g., chip designers) of the computational load to be expected based on executing network (e.g., social-networking system 160) production data workloads along with the characteristics of the production data workloads (e.g., bursts of large computations vs. steady stream of medium computations). In this regard, the exemplary embodiments may capture these two aspects of the computation load and the characteristics of the production data workloads associated with feature table data lookup operations.

In view of the foregoing and as described above, the exemplary embodiments may utilize a statistical model generated based on actual data (e.g., system data) to capture one or more characteristics of the actual data which may be beneficial for designing a tuned architecture (e.g., a hardware item(s), an application(s), etc.). Based in part on the exemplary embodiments determining frequency rates of indices (e.g., indexes) associated with the actual data, and/or data lookup table patterns, the exemplary embodiments may influence the manner in which hardware (e.g., a chip, a memory (e.g., a cache system)) may be designed. For purposes of illustration and not of limitation, by determining that system data may require a particular amount of computing for a given operation(s), this may influence an amount of chip area devoted to computations of a computing device allowing for improved power consumption and may conserve memory space for storage of data associated with other operations.

Figure 4:
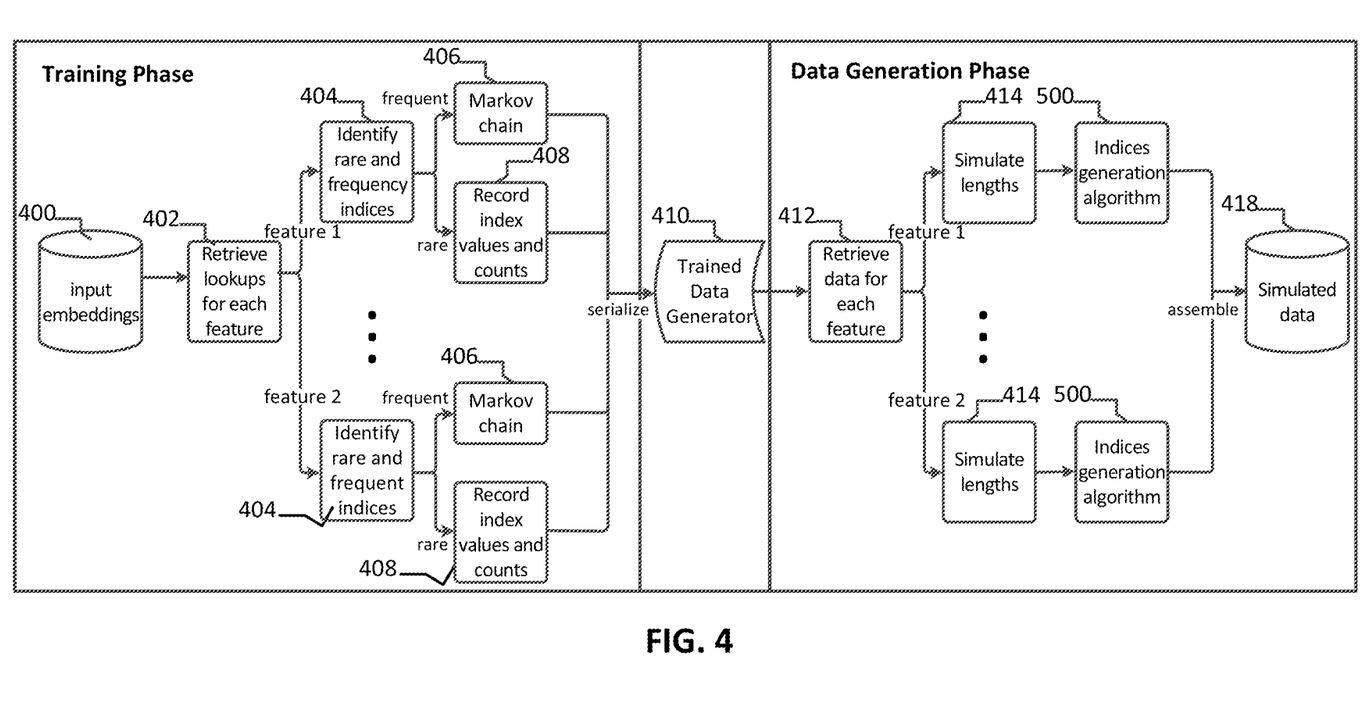
FIG. 4 is a diagram of an exemplary training and data generation process in accordance with an exemplary embodiment.

Referring now to FIG. 4, a diagram illustrating a process for generating synthetic/simulated data is provided according to an exemplary embodiment. The process may begin with an apparatus such as for example synthetic data generator module 98 implementing a training phase. In this regard, at operation 400, the synthetic data generator module 98 may store a plurality of input embeddings. For purposes of illustration and not of limitation, the input embeddings may, but need not, be associated with content such as, for example, production data captured by a network device (e.g., network device 160). The production data may, but need not, be associated with for example tracking activities (e.g., accessing of webpages, likes/interactions with content by users (e.g., users 101), user device types, content types (e.g., advertisements, newsfeeds), etc.) occurring within a system (e.g., system 100). The production data may, but need not, also be associated with types of content (e.g., advertisements, multimedia content, etc.). The production data associated with the input embeddings may be any suitable content captured by a network device based in part on activities and/or content types that may occur within a system. The synthetic data generator module 98 may characterize the production data and may generate feature tables associated with different feature characteristics such as sparse features (e.g., device types as described in an example above) of the production data.

At operation 402, the synthetic data generator module 98 may retrieve lookup data patterns for each of the features (e.g., sparse features) from the input embeddings associated with the production data. The synthetic data generator module 98 may extract the lookup data patterns for each of the features (e.g., sparse features) of the input embeddings. As one example, the lookup data pattern for one feature may be [[1,2,3,4],[1,7],[2],[1,3,5,6],[1,1,2,6]], which may be a nested list. The i-th inner list may represent the feature table lookups that the i-th output (e.g., data output) is associated with in the input embeddings associated with this feature (e.g., device type as one example). Data lookup patterns for a given output may then be aggregated together by the synthetic data generator module 98. As such, the length of the i-th inner list may be utilized by the synthetic data generator module 98 as a proxy for determining the computational burden of computing the i-th output. Nested lists, as the lookup data patterns for example, may be determined for all sparse features associated with the input embeddings. The lengths for the inner lists and the unique number of indices may be much larger (or smaller) in some examples. In the example above, there may be 5 inner lists of the nested list and each inner list may have a unique number of indices (e.g., the first inner list includes 4 unique indices, which are 1, 2, 3 and 4 corresponding to inner list [1,2,3,4]).

At operation 404, the synthetic data generator module 98 may identify/determine one or more rare and/or frequent indices from each of the nested lists. For example, the synthetic generator module 98 may categorize the indices that are looked up for each of the features into two classes such as, for example, rare indices and frequent indices. For purposes of illustration and not of limitation, the rare indices may be indices with appearances below a predetermined threshold. In the previous example above of the nested list [[1,2,3,4],[1,7],[2],[1,3,5,6],[1,1,2,6]], the unique indices 4 and 7 may be rare indices since these indices only appeared once (e.g., below a predetermined threshold). The synthetic generator data module 98 may determine that the other indices of this nested list (e.g., [[1,2,3,4],[1,7],[2],[1,3,5,6], [1,1,2,6]]) are frequent indices (e.g., above the predetermined threshold). For example, unique indices 2 is indicated 3 times in the nested list example above which may be above a predetermined threshold (e.g., 2, etc.).

At operation 406, the synthetic generator data module 98 may, for determined frequent indices associated with each of the features, generate a Markov chain for the frequent indices. A Markov chain may be a statistical summary of the order of appearances of the indices. In this regard, utilizing the nested list example above, the synthetic generator data module 98 may first remove each of the determined rare indices, which were 4 and 7 in this example. As such, the lookup data pattern determined by the synthetic generator data module 98 for this Markov chain may be [[1,2,3],[1], [2],[1,3,5,6],[1,1,2,6]].

For each determined frequent index, the synthetic generator data module 98 may determine the probability distribution of the next index (unless there is no next index in which case the Markov chain may end). Consider for example frequent indices 1 in the Markov chain above which is [[1,2,3],[1],[2],[1,3,5,6],[1,1,2,6]]. In this example, frequent indices 1, is followed by 2 two times, ends the chain one time, is followed by another 1 one time, and followed by 3 one time. Accordingly, the Markov chain involving index 1 may be determined by the synthetic generator data module 98 as {1: 0.2, 2: 0.4, 3: 0.2, END: 0.2}. The Markov chain involving index 1 may be, for example, one state (referred to herein as state 1) in an entire Markov chain. The Markov chain involving index 1 may characterize/denote the probability of moving to other states, given that state 1 is currently being considered. In this example, the state 1 occurs a total of 5 times. The synthetic data generator module 98 may determine the probability distribution values by dividing the number of occurrences following frequent indices 1 divided by the total number of occurrences of 1 in the original nested list of indices (e.g., [[1,2,3],[1],[2],[1,3, 5,6],[1,1,2,6]]) which is 5 in this example. By dividing these occurrences/frequencies by the number of appearances, the synthetic data generator module 98 may determine a transition probability which is {1: 0.2, 2: 0.4, 3: 0.2, END: 0.2} in this example. The synthetic data generation module 98 may make this determination as follows. Since state 1 is followed by another 1 one time (e.g., [1,1,2,6]), it is determined by the synthetic data generation module 98 to have a probability 1/5=0.2. Since state 1 is followed by 2 two times (e.g., [1,2,3],[1,1,2,6]), it is determined by the synthetic data generation module 98 to have a probability 2/5=0.4. Since state 1 is followed by 3 one time (e.g., [1,3,5,6]), it is determined by the synthetic data generation module 98 to have a probability 1/5=0.2. Since state 1 ends the Markov chain one time (e.g., [1]), it is determined to have a probability 1/5=0.2. The synthetic data generator module 98, in this example, may determine that indices 2 has a higher of chance, among the indices in the Markov chain, (e.g., at 40% probability distribution) of being the next index following frequent indices 1. The synthetic data generator module 98 may determine the probability distributions of the next index in a similar manner for each of the frequent indices for each of the features (e.g., sparse features) associated with the input embeddings. In some exemplary embodiments, determining the probability distribution of the next index may be considered as a lossy compression of the original lookup data patterns associated with the frequent indices.

At operation 408, for the rare indices associated with a feature(s), the synthetic data generator module 98 may record the distribution of index values and the proportion of rare indices. Consider the nested list above, which is [[1,2,3,4],[1,7],[2],[1,3,5,6],[1,1,2,6]]. In this example, the rare indices are 4 and 7, each appearing once, as described above. As such, the synthetic data generator module 98 may determine that the distribution of rare index values is {4: 0.5, 7: 0.5} (e.g., 1 occurrence (of 4 and 7) divided by the 2 rare indices (e.g., [4],[7])=0.5).

For the feature, in this example, associated with the data lookup pattern (e.g., the nested list) of [[1,2,3,4],[1,7],[2],[1,3,5,6],[1,1,2,6]], the total length is 15. The synthetic data generator module 98 may determine the total length of 15 by summing up the lengths for each of the inner lists in the data lookup pattern, while 2 of them are rare indices, as described above. Accordingly, the synthetic data generator module 98 may determine the proportion of rare indices in this instance is 2/15=0.133. The distribution of rare indices values and the distribution proportions may be determined by the synthetic data generator module 98 and may be recorded/stored for each of the features associated with the input embeddings.

At operation 410, the synthetic data generator module 98 may for the Markov chain for frequent indices associated with operation 106 and the rare indices associated with operation 108 be serialized in a configuration (config) file for each of the features associated with the input embeddings. This serialization of the Markov chain for frequent indices and the rare indices in the config file may complete the training phase of the synthetic data generator module 98. The config file may be utilized by the synthetic data generator module 98 to generate synthetic data lookup patterns. A state defining the synthetic data generator module 98 may consist of these two pieces of information associated with the Markov chain for frequent indices and the rare indices and in response to the config file being written (e.g., stored in memory (e.g., RAM 82)), the synthetic data generator module 98 may be considered as fully trained and may next perform a data generation phase (e.g., synthetic data generation).

At operation 412, the synthetic data generator module 98 may retrieve data associated with each of the features in the config file. At operation 414, the synthetic data generator module 98 may simulate lengths associated with synthetic data lookup patterns. In this regard, the synthetic data generator module 98 may determine the lengths for the inner lists of the nested lists for each of the features associated with input embeddings (e.g., source data). This may be achieved by the synthetic data generator module 98 sampling from the length distribution obtained from the original/source data associated with the input embeddings. The synthetic data generator module 98 may sample this information from the config file. In this example, the length for each inner list may be determined as [4,2,1,4,4] based on sampling the length distribution obtained from the original/source data (e.g., [[1,2,3,4],[1,7],[2],[1,3,5,6],[1,1,2,6]]).

In simulating the lengths, the synthetic data generator module 98 may make draws with replacement from this list as the simulated lengths. For example, the synthetic data generator module 98 may determine [4,4,1,1,2] as the simulated lengths. The synthetic data generator module 98 may determine the simulated lengths [4,4,1,1,2] by randomly selecting lengths from the lengths vector of the inner list, which is [4,2,1,4,4], five times. For purposes of illustration and not of limitation, in order to randomly select the lengths, consider a set having the five numbers of the inner list [4,2,1,4,4]. The synthetic data generator module 98 may randomly pick a number (e.g., 4, 2, etc.) from the set, and may record the number and insert the recorded number back in the set. The synthetic data generator module 98 may repeat this step four times for a total of five times (i.e., since there are five numbers in the set) to obtain five randomly selected numbers, which may correspond to/denote the simulated lengths [4,4,1,1,2] in this example. These five numbers that were selected and recorded, in this example, may be referred to as a result of a draw with replacement. In this example, [4,2,1,4,4] are the lengths of the actual inner list of indices and [4,4,1,1,2] are the simulated lengths based on randomly selecting the lengths of the actual inner list of indices. Benefits from this random selection technique may be two-fold. For example, this random selection technique may introduce stochasticity to the length generation process such that the same configuration of data (e.g., [4,2,1,4,4]) may be utilized to generate different synthetic datasets (e.g., [4,4,1,1,2], etc.,) by repeating the random data generation process (e.g., randomly selecting the lengths). The aspects of this random selection technique may also be particularly useful for external users of the data (e.g., [4,2,1,4,4]). For example, this random selection technique may enable the external users to generate new datasets that may have similar statistical properties from the same configuration data. This random selection technique may also add an additional layer of obfuscation to preserve the privacy of the data.

Figure 5:
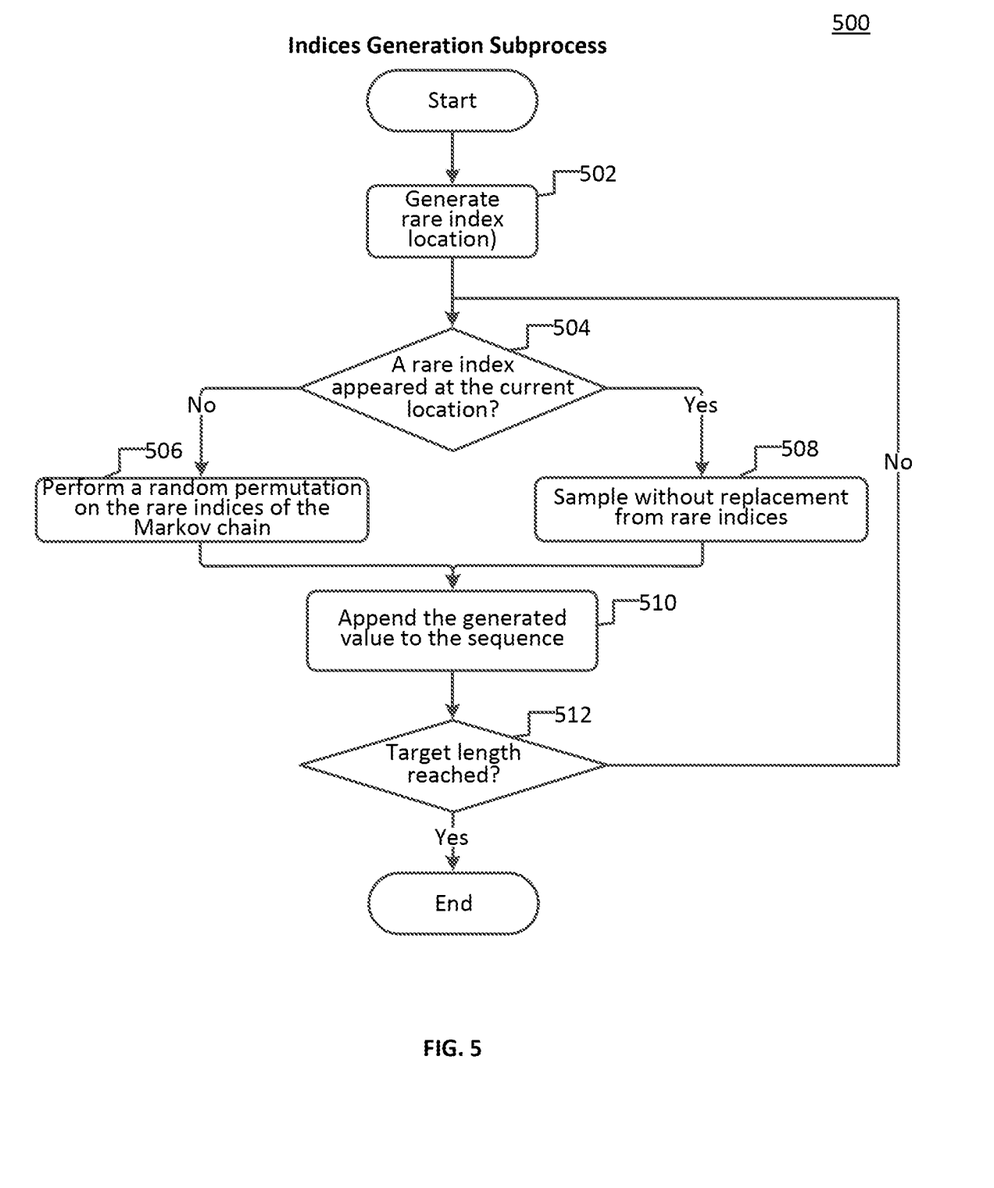
FIG. 5 is a diagram of an exemplary indices generation process in accordance with an exemplary embodiment.

As a next step in synthetic data generation, at operation 500, the synthetic data generator module 98 may generate the indices sequences for each of the features associated with the original/source data associated with the input embeddings. Referring to FIG. 5, a subprocess of operation 500 may be implemented by the synthetic data generation module 98 associated with indices generation. The synthetic data generator module 98 may have already determined the target length of the synthetic sequence (e.g., the sum of the simulated length). In this example, the target length of the synthetic sequence is 12 as determined by the synthetic data generator module 98. The target length is the summation of each individual lengths of the inner lists (e.g., determined by adding up [4,4,1,1,2] to obtain 12).

In the subprocess of the operation 500, the synthetic data generator module 98 may determine locations where to put the rare indices in synthetic data, at step 502. The synthetic data generator module 98 may determine whether one or more rare indices appear at a location(s) based in part on analyzing the rare indices in the config file, at step 504. In this regard, the synthetic data generator module 98 may randomly select locations in the indices vacancies of the target length of 12 such that the proportion is similar to the proportion of rare indices that the synthetic data generator module 98 determined with regards to the original/source data associated with the input embeddings. In this example, the synthetic data generator module 98 determined that the proportion of rare indices associated with the original/source data was 0.133, as described above. As such, the synthetic data generator module 98 may randomly pick 12*0.133=1.6, for example, 2 locations within the 12 slots of the target length. Presume for example that the synthetic data generator module 98 selected locations 3 and 8 in the target length 12. In this regard, the synthetic data generator module 98 may fill in these two slots with a random permutation of the rare indices based in part on sampling, without replacing, the rare indices indicated in the config file, at step 506. As described above, the synthetic data generator module 98 determined that rare indices were 4 and 7 and may determine a random permutation of the rare indices as [7, 4]. Therefore, the synthetic data generator module 98 may determine the synthetic sequence as [x,x,7,x,x,x,x,4,x,x,x,x] in which x stands for vacancies.

At step 508, the synthetic data generator module 98 may generate the remainder of the synthetic sequence based in part on utilizing Markov chains in the manner described above with regards to operation 406. In an instance in which the Markov chain may END before reaching the target length, the synthetic data generator module 98 may restart the Markov chain. The Markov chain may end in the simulation before the target length is reached. In this regard, no more numbers may be generated once the Markov chain reaches the END state. In an instance in which the Markov chain reaches the END state, the synthetic data generator module 98 may restart the same Markov chain and may append the generated numbers to the original simulation result until the target length is reached. In this example, the synthetic data generator module 98 may determine that a sequence with length 10 may be needed to complete the synthetic sequence since 2 locations within the 12 slots of the target length have been occupied by rare indices (e.g., [7, 4]). The synthetic data generator module 98 may run/execute the Markov chain repeatedly until the length 10 is met. For purposes of illustration and not of limitation, the synthetic data generator module 98 may run/execute the Markov chain to determine a synthetic sequence such as, for example, [1,2,6,1,3,5,6,1,1,2] having length 10.

The synthetic data generator module 98 may append the 10 slots associated with the frequent indices corresponding to the Markov chain with the 2 slots associated with the rare indices to determine a synthetic sequence, at step 510. The synthetic data generator module 98 may determine whether the appended synthetic sequence has reached the target length, which is 12 in this example, at step 512. If the target length is not reached, the process may return to step 504 and continues. On the other hand, in an instance in which the synthetic data generator module 98 determines that the entire synthetic sequence has reached the target length 12 (e.g., 12 slots), the synthetic data generator module 98 may put the Markov chain synthetic sequence with the empty slots and the indices generation process may end. As described above, the synthetic data generator module 98 may have selected slots 3 and 8 of the 12 slots to fill in two slots (e.g., [7, 4]) as the rare indices. As such, in an example embodiment, the synthetic data generator module 98 may determine the entire synthetic sequence having target length 12 as [1,2,7,6,1,3,5,4,6,1,1,2] based in part on putting the Markov chain synthetic sequence of [1,2,6,1,3,5,6,1,1,2] in the empty slots of [x,x,7,x,x,x,x,4,x,x,x,x].

At operation 418, the synthetic data generator module 98 may repeat operations 414 and 500 (e.g., including the subprocess operations of operation 500 in FIG. 5) as a final assembling stage. At operation 418, the synthetic data generator module 98 may regroup the indices into inner lists according to the simulated lengths. In this example, the simulated lengths were determined by the synthetic data generator module 98 as [4,4,1,1,2]. As such, the entire synthetic sequence having target length 12 as [1,2,7,6,1,3, 5,4,6,1,1,2] may be grouped by the synthetic data generator module 98 as [[1,2,7,6],[1,3,5,4],[6],[1],[1,2]], where the first inner list has a length of 4, the second inner list has a length of 4, the third inner list has a length of 1, the fourth inner list has a length of 1 and the fifth inner list has a length of 2.

In this manner, the synthetic data generator module 98 has determined a synthesized lookup data pattern (e.g., simulated data) associated with at least one feature (e.g., device type, etc.). Additionally, during operation 418, the synthetic data generator module 98 may repeat operations 414 and 500 (including the subprocess operations of operation 500) for each of the features (e.g., sparse feature) associated with the original/source data of the input embeddings and in this regard may determine complete simulated data associated with the original/source data associated with the input embeddings. The complete simulated data may have one or more characteristics/features associated with the original/source data but may not be the actual original/source data.

In some exemplary embodiments, the complete simulated data may be provided by the synthetic data generator module 98 to an entity (e.g., a remote entity) within a system (e.g., system 100) to enable the entity to develop an application(s) and/or hardware(s) (e.g., a chip(s)) tailored to the complete simulated data for usage by a network (e.g., social networking system 160). In some other exemplary embodiments, the complete simulated data may be provided by the synthetic data generator module 98 to an external entity (e.g., an external entity of third-party system 170) associated with a system (e.g., system 100) to enable the external entity (e.g., a hardware/chip design enterprise) to develop an application(s) and/or hardware(s) (e.g., a chip(s)) tailored for the complete simulated data for usage by a network (e.g., social networking system 160). The lookup data patterns associated with the complete final simulated data, generated by the synthetic data generator module 98 may enable the remote entity and/or the external entity to better understand the manner in which hardware (and/or an application) may be optimally generated such as, for example, a memory hierarchy of a chip(s). For purposes of illustration and not of limitation, in an instance in which the final complete simulated data has many frequent indices this may serve to denote that a memory hierarchy (e.g., chip area) may be smaller (e.g., relative to complete final data with many rare indices) but may need to have fast processing capability associated with the memory hierarchy to handle particular tasks/applications associated with the final complete simulated data. On the other hand, in an instance in which there may be many rare indices in the final complete simulated data, this may serve to denote that more memory space may be needed but slower processing capability may be satisfactory for the tasks/applications associated with the final complete simulated data. For instance, in some example embodiments, the co-processor 81 may also be influenced by the characteristics of the simulated data whereby many frequent indices may suggest a benefit to adding compression/decompression in a design (e.g., a hardware design) as a mechanism to reduce the burden on data movement technologies (e.g., memory hierarchies).

Figure 6:
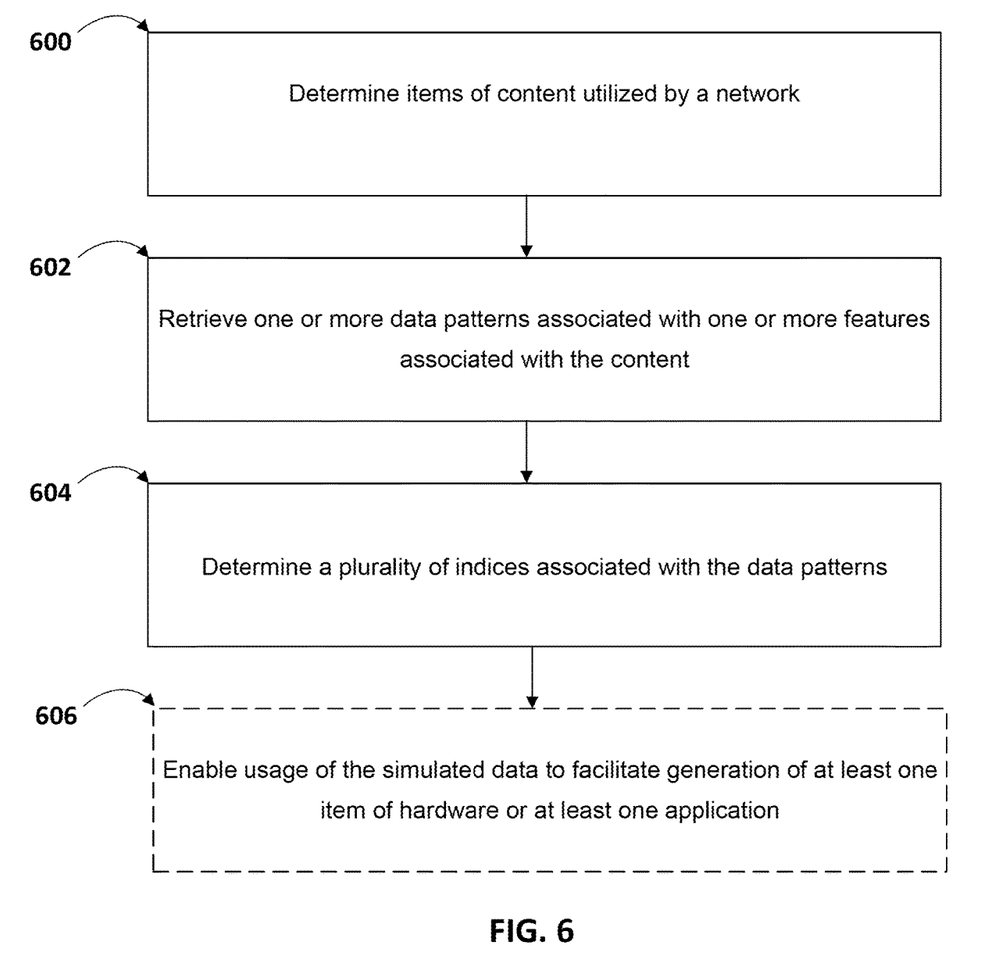
FIG. 6 is a diagram of an exemplary process for generating simulated data in accordance with an exemplary embodiment.

FIG. 6 illustrates an example flowchart illustrating operations for generating simulated data according to an exemplary embodiment. At operation 600, a device (e.g., network device 160) may determine items of content utilized by a network (e.g., system 100). The content may be associated one or more input embeddings that may be stored in a memory device. In some exemplary embodiments, the content may be utilized by a machine learning model associated with the network.

At operation 602, a device (e.g., network device 160) may retrieve one or more data patterns (e.g., lookup data table patterns) associated with one or more features associated with the content. The features may include one or more sparse features (e.g., device types, content types (e.g., advertisements, newsfeeds, other suitable features) associated with a network (e.g., system 100). At operation 604, a device (e.g., network device 160) may determine a plurality of indices associated with the data patterns. In an example embodiment, the device (e.g., network device 160) may determine one or more memory access patterns (e.g., lookup table data patterns) based on the plurality of indices. The device (e.g., network device 160) may determine a first frequency of a first set of the plurality of indices (e.g., frequent indices) and a second frequency of a second set of the plurality of indices (e.g., rare indices). The first set of the plurality of indices (e.g., frequent indices) may include a quantity of indices above a predetermined threshold. The second set of the plurality of indices (e.g., rare indices) may include a quantity of indices below the predetermined threshold.

At operation 606, a device (e.g., network device 160) may generate, based on the data patterns and the plurality of indices, simulated data associated with the content. In an exemplary embodiment, a device (e.g., a network device 160) may determine at least one length of one or more of the plurality of indices. A device (e.g., a network device 160) may generate the simulated data based in part on determining a simulated length(s) (e.g., a target length) associated with the determined length(s). Additionally, a device (e.g., a network device 160) may generate the simulated data based in part on applying at least one Markov chain to the first set of the plurality of indices (e.g., frequent indices). A device (e.g., network device 160) may also generate the simulated data based in part on applying a random permutation associated with the second set of the plurality of indices (e.g., rare indices) to determine another set of indices (e.g., a random permutation of the second set of indices) and may arrange/order the other set of indices in at least one sequence (e.g., a synthetic sequence).

Optionally, at operation of 608, a device may enable usage of the simulated data to facilitate generation of at least one item of hardware (e.g., a chip, a memory hierarchy of a memory device) or at least one application. The simulated data may be associated with one or more characteristics associated with the content of the network. In some exemplary embodiments, an entity of the network may generate the item of hardware(s) and/or the application(s). In other exemplary embodiments, an external entity (e.g., a hardware enterprise) associated with the network may generate the item of hardware(s) and/or the application(s).

Alternative Embodiments

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. A method comprising:
   determining items of content utilized by a network;
   retrieving one or more data patterns associated with one or more features associated with the content, the one or more data patterns including a number of indices;
   determining rare indices that appear less than threshold number of times in the indices; and
   generating, based on the data patterns and the indices, simulated data associated with the content, wherein the simulated data includes the rare indices, and wherein any remaining indices of the simulated data are generated using a Markov chain.

2. The method of claim 1, further comprising:
   enabling usage of the simulated data to facilitate generation of at least one item of hardware or at least one application.

3. The method of claim 1, wherein the simulated data is associated with one or more characteristics associated with the content.

4. The method of claim 1, further comprising:
determining one or more memory access patterns based on the indices.

5. The method of claim 1, further comprising determining indices that appear greater than or equal to the threshold number of times in the indices.

6. The method of claim 1, wherein generating the simulated data comprises applying a random permutation associated with the rare indices and arranging the rare indices in a sequence.

7. The method of claim 1, wherein the simulated data includes a same number of indices as the one or more data patterns.

8. A system comprising:
a device comprising one or more processors; and
at least one memory storing instructions, that when executed by the one or more processors, cause the device to:
determine items of content utilized by a network;
retrieve one or more data patterns associated with one or more features associated with the content, the one or more data patterns including a number of indices;
determining rare indices that appear less than threshold number of times in the indices; and
generate, based on the data patterns and the indices, simulated data associated with the content, wherein the simulated data includes the rare indices, and wherein any remaining indices to fill the number of indices are generated using a Markov chain.

9. The system of claim 8, wherein when the one or more processors further execute the instructions, further causes the device to:
enable usage of the simulated data to facilitate generation of at least one item of hardware or at least one application.

10. The system of claim 8, wherein the simulated data is associated with one or more characteristics associated with the content.

11. The system of claim 8, wherein when the one or more processors further execute the instructions, further causes the device to:
determine one or more memory access patterns based on the indices.

12. The system of claim 8, wherein when the one or more processors further execute the instructions, further causes the device to determine indices that appear greater than or equal to the threshold number of times in the indices.

13. A computer-readable medium storing instructions that, when executed, cause:
determining items of content utilized by a network;
retrieving one or more data patterns associated with one or more features associated with the content, the one or more data patterns including a number of indices;
determining rare indices that appear less than threshold number of times in the indices; and
generating, based on the data patterns and the indices, simulated data associated with the content, wherein the simulated data includes the rare indices, and wherein any remaining indices to fill the number of indices are generated using a Markov chain.

14. The computer-readable medium of claim 13, wherein the instructions, when executed, further cause:
enabling usage of the simulated data to facilitate generation of at least one item of hardware or at least one application.

* * * * *